US011642994B2

United States Patent
Katsube et al.

(10) Patent No.: US 11,642,994 B2
(45) Date of Patent: May 9, 2023

(54) VEHICLE SEAT

(71) Applicant: NHK SPRING CO., LTD., Yokohama (JP)

(72) Inventors: Kenichi Katsube, Yokohama (JP); Katsutoshi Imanari, Yokohama (JP); Yuma Terada, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 17/454,369

(22) Filed: Nov. 10, 2021

(65) Prior Publication Data
US 2022/0153173 A1 May 19, 2022

(30) Foreign Application Priority Data
Nov. 13, 2020 (JP) .............................. JP2020-189803

(51) Int. Cl.
*B60N 2/68* (2006.01)
*B60N 2/70* (2006.01)
*B60N 2/72* (2006.01)
*B60N 2/66* (2006.01)
*A47C 7/46* (2006.01)

(52) U.S. Cl.
CPC .............. *B60N 2/666* (2015.04); *A47C 7/462* (2013.01); *B60N 2/7058* (2013.01); *B60N 2/7094* (2013.01)

(58) Field of Classification Search
CPC ...... B60N 2/7058; B60N 2/7094; A47C 7/282
USPC ....................................... 297/452.55, 452.52
See application file for complete search history.

(56) References Cited

U.S. PATENT DOCUMENTS

| | | | | |
|---|---|---|---|---|
| 3,902,756 A | * | 9/1975 | Chubb | A47C 7/22 297/452.56 |
| 4,702,522 A | * | 10/1987 | Vail | B60N 2/7094 297/452.56 |
| 4,842,257 A | * | 6/1989 | Abu-Isa | B60N 2/7011 297/452.56 |
| 5,328,248 A | * | 7/1994 | Nishiyama | B60N 2/0825 297/452.56 |
| 5,439,271 A | * | 8/1995 | Ryan | B60N 2/68 297/452.56 |
| 5,839,782 A | * | 11/1998 | Kashiwamura | B60N 2/502 297/337 |
| 5,857,750 A | * | 1/1999 | Kashiwamura | A47C 7/14 267/143 |

(Continued)

FOREIGN PATENT DOCUMENTS

| | | | | |
|---|---|---|---|---|
| EP | 1995126 A1 | * | 11/2008 | ............ B60N 2/68 |
| EP | 3228495 A1 | * | 10/2017 | ........... B60N 2/7094 |

(Continued)

*Primary Examiner* — Rodney B White
(74) *Attorney, Agent, or Firm* — Knobbe, Martens, Olson & Bear, LLP

(57) ABSTRACT

A vehicle seat comprising: a seat cushion frame that structures a frame of a seat cushion and that is configured to support buttocks of a seated vehicle occupant; a seat cushion pad mounted to the seat cushion frame; and a pelvis supporting portion having a push-up portion that is provided at a seat lower side of the seat cushion pad along a seat left-right direction and that, by being displaced toward a seat upper side, pushes a seat rear side portion of the seat cushion pad toward the seat upper side.

6 Claims, 8 Drawing Sheets

(56) References Cited

U.S. PATENT DOCUMENTS

| | | | | |
|---|---|---|---|---|
| 6,010,195 | A * | 1/2000 | Masters | B60N 2/0747 |
| | | | | 297/284.11 |
| 6,412,874 | B1 * | 7/2002 | Mayer | B60N 2/7094 |
| | | | | 297/452.52 |
| 7,137,669 | B2 * | 11/2006 | Nagayama | F16F 1/26 |
| | | | | 297/452.52 |
| 7,422,291 | B2 * | 9/2008 | Nagayama | B60N 2/165 |
| | | | | 297/452.52 |
| 7,971,939 | B2 * | 7/2011 | Fujita | B60N 2/70 |
| | | | | 297/452.56 |
| 8,662,483 | B2 * | 3/2014 | Yamaguchi | B60N 2/72 |
| | | | | 297/452.52 X |
| 9,376,043 | B2 * | 6/2016 | Medoro | B60N 2/7094 |
| 9,718,383 | B2 * | 8/2017 | Matsui | B60N 2/7094 |
| 9,950,650 | B1 * | 4/2018 | Watanabe | B60N 2/01583 |
| 10,081,279 | B2 * | 9/2018 | Line | B60N 2/0232 |
| 10,279,707 | B2 * | 5/2019 | Matsui | B60N 2/72 |
| 10,391,910 | B2 * | 8/2019 | Line | B60N 2/7094 |
| 10,556,528 | B2 * | 2/2020 | Ninagawa | B60N 2/682 |
| 10,569,670 | B2 * | 2/2020 | Mizukoshi | B60N 2/1615 |
| 10,640,011 | B2 * | 5/2020 | Anzenberger | B60N 2/62 |
| 10,654,385 | B2 * | 5/2020 | Onuma | B60N 2/682 |
| 10,940,776 | B2 * | 3/2021 | Line | B60N 2/1695 |
| 11,091,064 | B2 * | 8/2021 | Kim | B60N 2/1803 |
| 2010/0133732 | A1 * | 6/2010 | Yamaguchi | B60N 2/002 |
| | | | | 267/140.4 |
| 2012/0133193 | A1 * | 5/2012 | Abe | B60N 2/5825 |
| | | | | 297/452.55 |
| 2013/0119741 | A1 * | 5/2013 | Medoro | B60N 2/4228 |
| | | | | 297/452.18 |
| 2015/0343932 | A1 * | 12/2015 | Hosoe | B60N 2/72 |
| | | | | 297/452.52 |
| 2016/0059752 | A1 * | 3/2016 | Kishida | B60N 2/42709 |
| | | | | 297/344.12 |
| 2016/0137113 | A1 * | 5/2016 | Takahashi | B60N 2/7094 |
| | | | | 297/452.52 |
| 2016/0185265 | A1 * | 6/2016 | Römer | B60N 2/7094 |
| | | | | 297/311 |
| 2016/0368404 | A1 * | 12/2016 | Sammons | B60N 2/7047 |
| 2017/0028890 | A1 * | 2/2017 | Matsui | B60N 2/68 |
| 2017/0120789 | A1 * | 5/2017 | Kijima | B60N 2/72 |
| 2018/0272906 | A1 * | 9/2018 | Onuma | B60N 2/68 |
| 2018/0272909 | A1 * | 9/2018 | Misono | B60N 2/70 |
| 2018/0272969 | A1 * | 9/2018 | Onuma | B60R 16/0215 |
| 2020/0114788 | A1 * | 4/2020 | Jaradi | B60N 2/42763 |
| 2020/0247270 | A1 * | 8/2020 | Onuma | B60N 2/002 |
| 2020/0247271 | A1 * | 8/2020 | Onuma | B60N 2/686 |
| 2021/0070205 | A1 * | 3/2021 | Mizoi | B60N 2/7094 |
| 2022/0185482 | A1 * | 6/2022 | Adcock | B60N 2/7058 |

FOREIGN PATENT DOCUMENTS

| | | | | |
|---|---|---|---|---|
| EP | 3381740 | A1 * | 10/2018 | B60N 2/002 |
| FR | 2883524 | A1 * | 9/2006 | B60N 2/2893 |
| FR | 2917023 | A1 * | 12/2008 | B60N 2/2893 |
| JP | 2010-004967 | A | 1/2010 | |
| JP | 2019-135135 | A | 8/2019 | |
| WO | WO-2016104483 | A1 * | 6/2016 | A47C 7/02 |

* cited by examiner

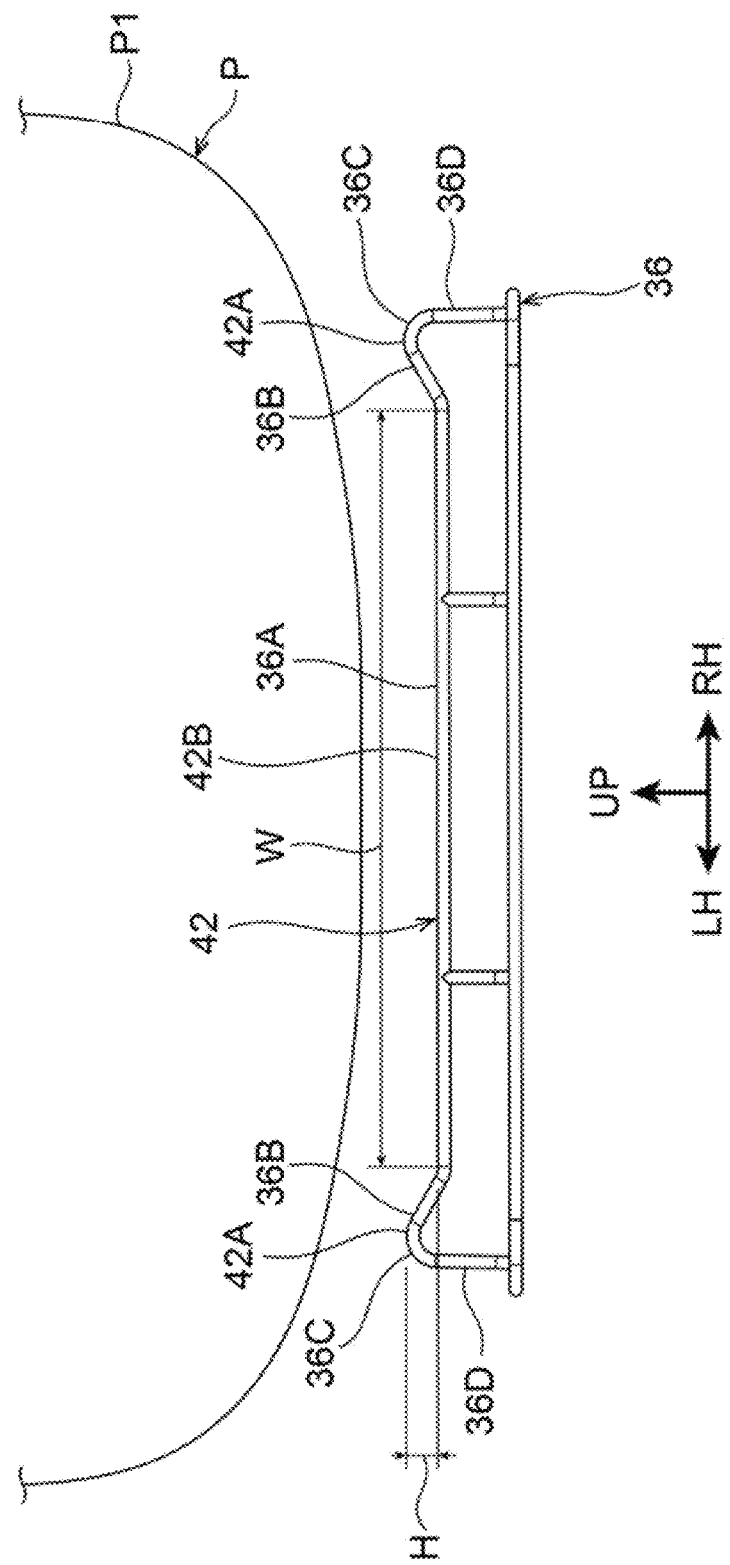

VEHICLE SEAT

CROSS-REFERENCE TO RELATED APPLICATION

This application claims priority under 35 USC 119 from Japanese Patent Application No. 2020-189803 filed on Nov. 13, 2020, the disclosure of which is incorporated by reference herein in its entirety.

BACKGROUND

Technical Field

The present disclosure relates to a vehicle seat.

Related Art

Japanese Patent Application Laid-Open (JP-A) No. 2010-4967 discloses a pelvis cushion at which adjustment can be carried out at the region from the buttocks to the lumbar region of the seated person. The pelvis cushion disclosed in this document has a frame, a cushion member mounted to the frame, and a cover member covering the cushion member. The pelvis cushion has three airbags that are provided at three places of the cushion member, respectively. Of the three airbags, two of the airbags are provided at the left and right end portions of the cushion member respectively, and the remaining one airbag is provided at the left-right central portion of the rear end portion of the cushion member. Due to air being supplied into the three airbags and the three airbags inflating, the portions of the cushion member at which the three airbags are provided are pushed-up. Due thereto, adjustment can be carried out at the region from the buttocks to the lumbar region of the seated person.

By the way, at a vehicle seat upon which a vehicle occupant sits, it is essential to disperse the body pressure of the seated occupant while supporting his/her pelvis. However, in the pelvis cushion disclosed in JP-A No. 2010-4967, it is easy for the body pressure to become high at the portions corresponding to the airbags, and it is difficult to disperse the body pressure.

SUMMARY

In view of the above-described circumstances, an object of the present disclosure is to provide a vehicle seat that can disperse the body pressure of a seated vehicle occupant while supporting his/her pelvis.

A vehicle seat of a first aspect has: a seat cushion frame that structures a frame of a seat cushion and that is configured to support buttocks of a seated vehicle occupant; a seat cushion pad mounted to the seat cushion frame; and a pelvis supporting portion having a push-up portion that is provided at a seat lower side of the seat cushion pad along a seat left-right direction and that, by being displaced toward a seat upper side, pushes a seat rear side portion of the seat cushion pad toward the seat upper side.

In accordance with the vehicle seat of the first aspect, the seat cushion pad is mounted to the seat cushion frame, and the pelvis supporting portion is provided at the lower side of the seat cushion pad. When the push-up portion of the pelvis supporting portion is displaced toward the seat upper side, the seat rear side portion of the seat cushion pad is pushed-up toward the seat upper side. Due thereto, the pelvis of the seated vehicle occupant can be supported. Further, due to the push-up portion of the pelvis supporting portion being provided along the seat left-right direction at the seat lower side of the seat cushion pad, the body pressure of the buttocks of the seated vehicle occupant can be dispersed.

In a vehicle seat of a second aspect, in the vehicle seat of the first aspect, both side portions in the seat left-right direction of the push-up portion are formed in shapes that are convex toward the seat upper side, with respect to a central portion in the seat left-right direction of the push-up portion.

In accordance with the vehicle seat of the second aspect, the both side portions in the seat left-right direction of the push-up portion of the pelvis supporting portion are formed in shapes that are convex toward the seat upper side, with respect to the central portion in the seat left-right direction at the push-up portion. Due thereto, at the time when the push-up portion of the pelvis supporting portion rises-up, the seat rear side portion of the seat cushion pad can be pushed-up in a shape that runs along the buttocks of the seated vehicle occupant.

In a vehicle seat of a third aspect, in the vehicle seat of the first aspect, the pelvis supporting portion has supported portions that are supported so as to be able to rotate with the seat left-right direction being an axial direction, and the push-up portion moves in a seat vertical direction due to the pelvis supporting portion being tilted in the seat vertical direction with the supported portions being a center of rotation.

In accordance with the vehicle seat of the third aspect, the push-up portion can be moved in the seat vertical direction by the simple structure of causing the pelvis supporting portion to tilt in the seat vertical direction with the supported portions of the pelvis supporting portion being the center of rotation.

In a vehicle seat of a fourth aspect, in the vehicle seat of the third aspect, the push-up portion is disposed further toward a seat rear side than the supported portions.

In accordance with the vehicle seat of the fourth aspect, the push-up portion of the pelvis supporting portion is disposed further toward the seat rear side than the supported portions. Due thereto, needless pushing-up of the portion, which is further toward the front side than the portion that is pushed-up by the push-up portion, at the seat cushion pad can be suppressed.

In a Vehicle seat of a fifth aspect, in the vehicle seat of the first aspect, spring portions, which span across the seat cushion frame and which undergo flexural deformation at a time when a load toward the seat lower side is inputted thereto from the seat cushion pad, are provided at the seat lower side of the seat cushion pad, and the pelvis supporting portion is supported by the spring portions.

In accordance with the vehicle seat of the fifth aspect, due to the pelvis supporting portion being supported by the spring portions, a deterioration in the seating comfort due to the provision of the pelvis supporting portion can be suppressed.

In a vehicle seat of a sixth aspect, in the vehicle seat of the fifth aspect, the pelvis supporting portion has supported portions that are supported so as to be able to rotate with the seat left-right direction being an axial direction, the push-up portion moves in a seat vertical direction due to the pelvis supporting portion being tilted in the seat vertical direction with the supported portions being a center of rotation, supporting members at which the supported portions are supported are fixed to the spring portions, and a recess, in whose interior the supporting members are disposed, is formed in the seat cushion pad.

In accordance with the vehicle seat of the sixth aspect, due to the recess, in whose interior the supporting members are disposed, being formed in the seat cushion pad, the body pressure of the buttocks of the seated vehicle occupant becoming high at the portions that correspond to the supporting members can be suppressed.

The vehicle seat relating to the present disclosure has the excellent effects of being able to disperse the body pressure of a seated vehicle occupant while supporting his/her pelvis.

BRIEF DESCRIPTION OF THE DRAWINGS

FIG. 8 is a back view showing the relationship of correspondence between the flap wire and the buttocks of a seated vehicle occupant.

DETAILED DESCRIPTION

Figure 1:
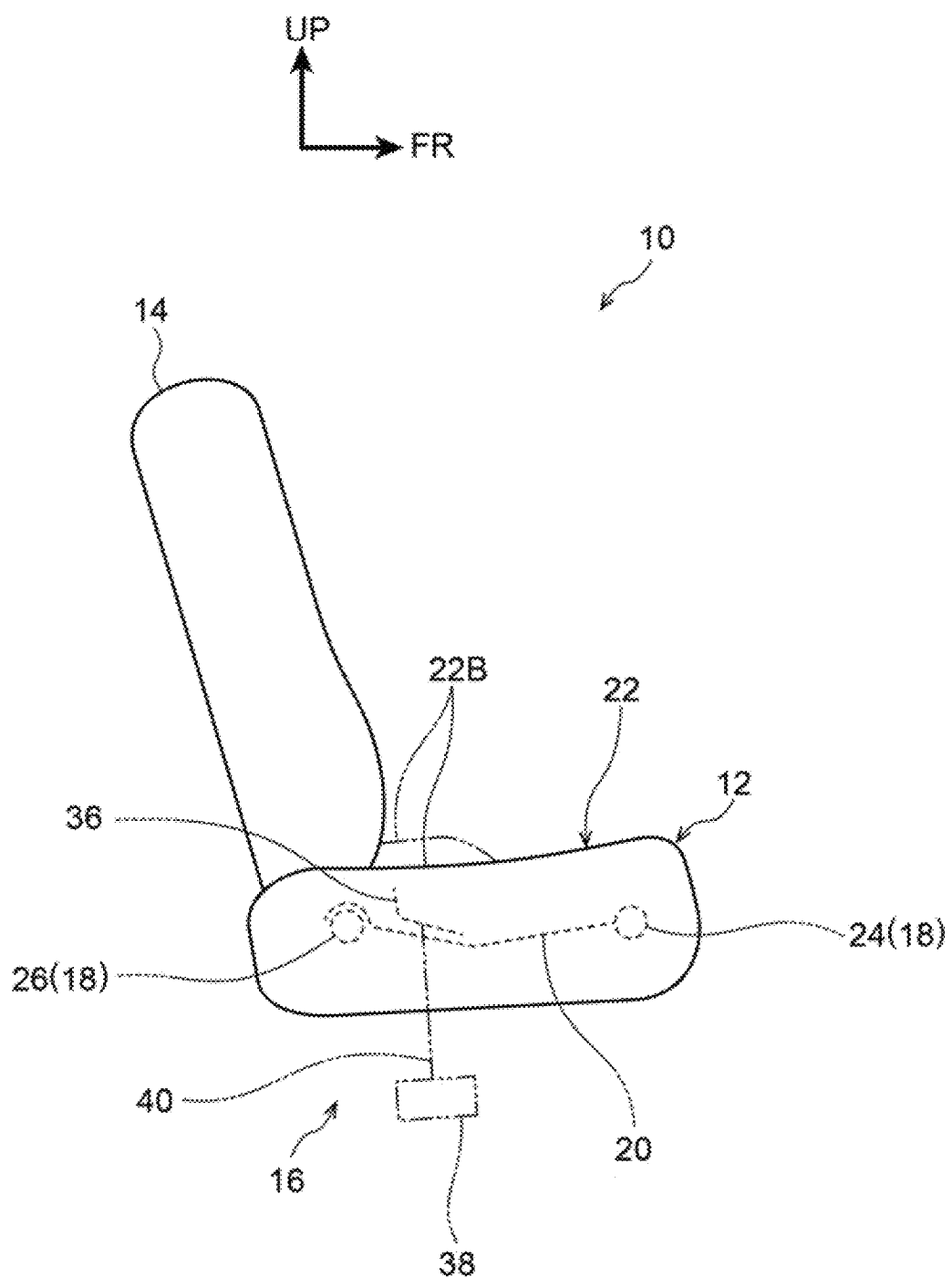
FIG. 1 is a side view schematically showing a vehicle seat that is equipped with a pelvis supporting device.

A vehicle seat 10 relating to an embodiment of the present disclosure is described by using FIG. 1 through FIG. 8. Note that arrow FR, arrow UP, arrow RH and arrow LH that are shown in the drawings indicate the seat front side, upper side, right side and left side, respectively, as seen from a vehicle occupant who is seated in the vehicle seat 10. Hereinafter, when explanation is given by merely using front-rear, vertical and left-right directions, they refer to the front-rear of the seat front-rear direction, the vertical of the seat vertical direction, and the left-right of the seat left-right direction, unless otherwise indicated.

As shown in FIG. 1, the vehicle seat 10 of the present embodiment has a seat cushion 12 that supports the buttocks of a seated vehicle occupant, and a seatback 14 that supports the back of the seated vehicle occupant. Further, the vehicle seat 10 has a pelvis supporting device 16 that supports the pelvis of the seated vehicle occupant.

The seat cushion 12 has a seat cushion frame 18 that structures the frame of the seat cushion 12, S springs 20 that are mounted to the seat cushion frame 18, and a seat cushion pad 22 that is disposed at the upper side of the S springs 20 and is mounted to the seat cushion frame 18.

The seat cushion frame 18 has an unillustrated pair of left and right side frame portions that are disposed with an interval therebetween in the left-right direction and extend in the front-rear direction, a front frame portion 24 that connects the front end sides of the pair of left and right side frame portions in the left-right direction, and a rear frame portion 26 that connects the rear end sides of the pair of left and right side frame portions in the left-right direction. As an example, the front frame portion 24 and the rear frame portion 26 are formed in the shapes of tubes whose axial directions are the left-right direction.

Figure 2:
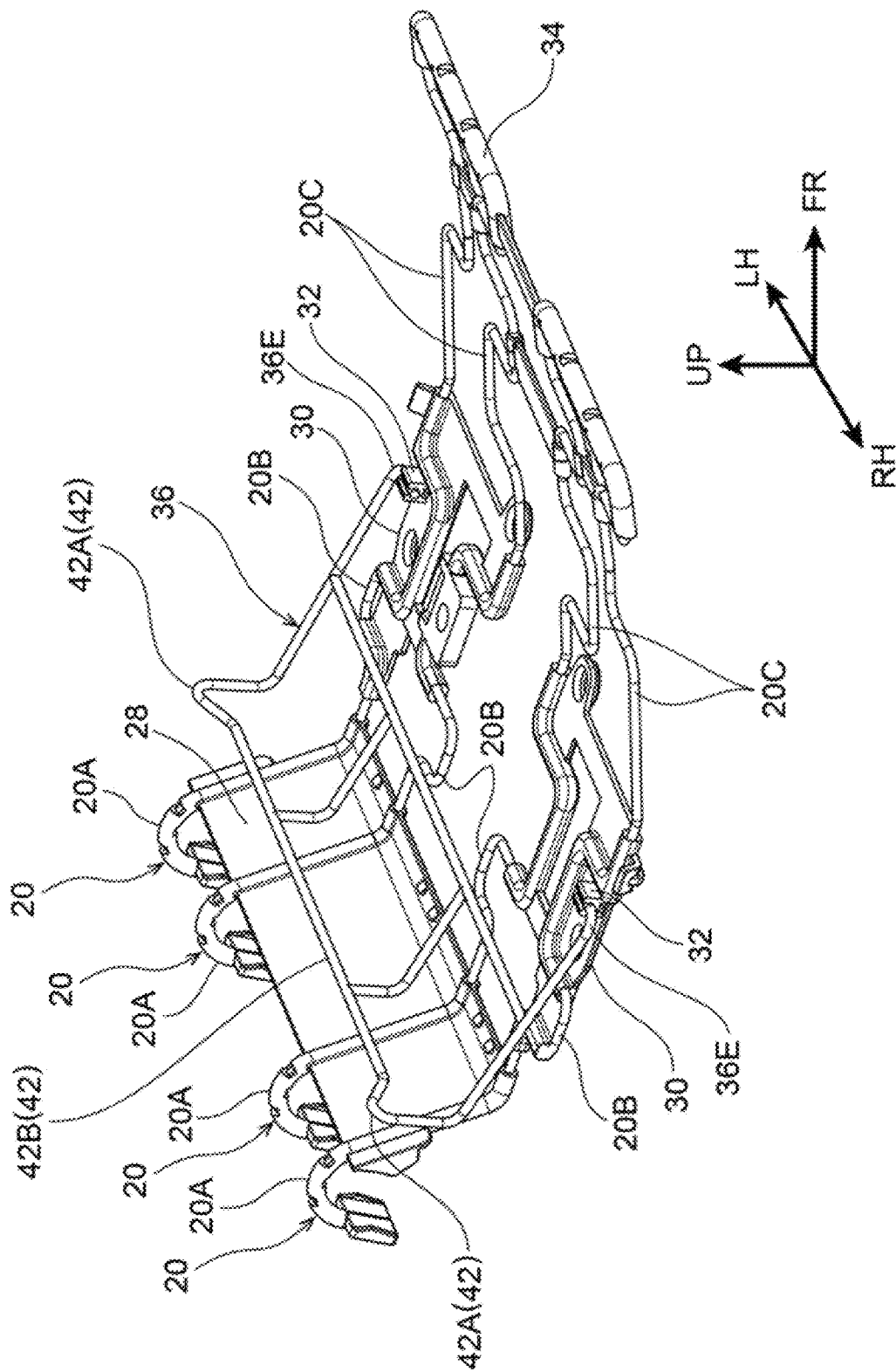
FIG. 2 is a perspective view in which a flap wire, which is supported by plural S springs, is seen from an obliquely front side of the seat.
Figure 3:
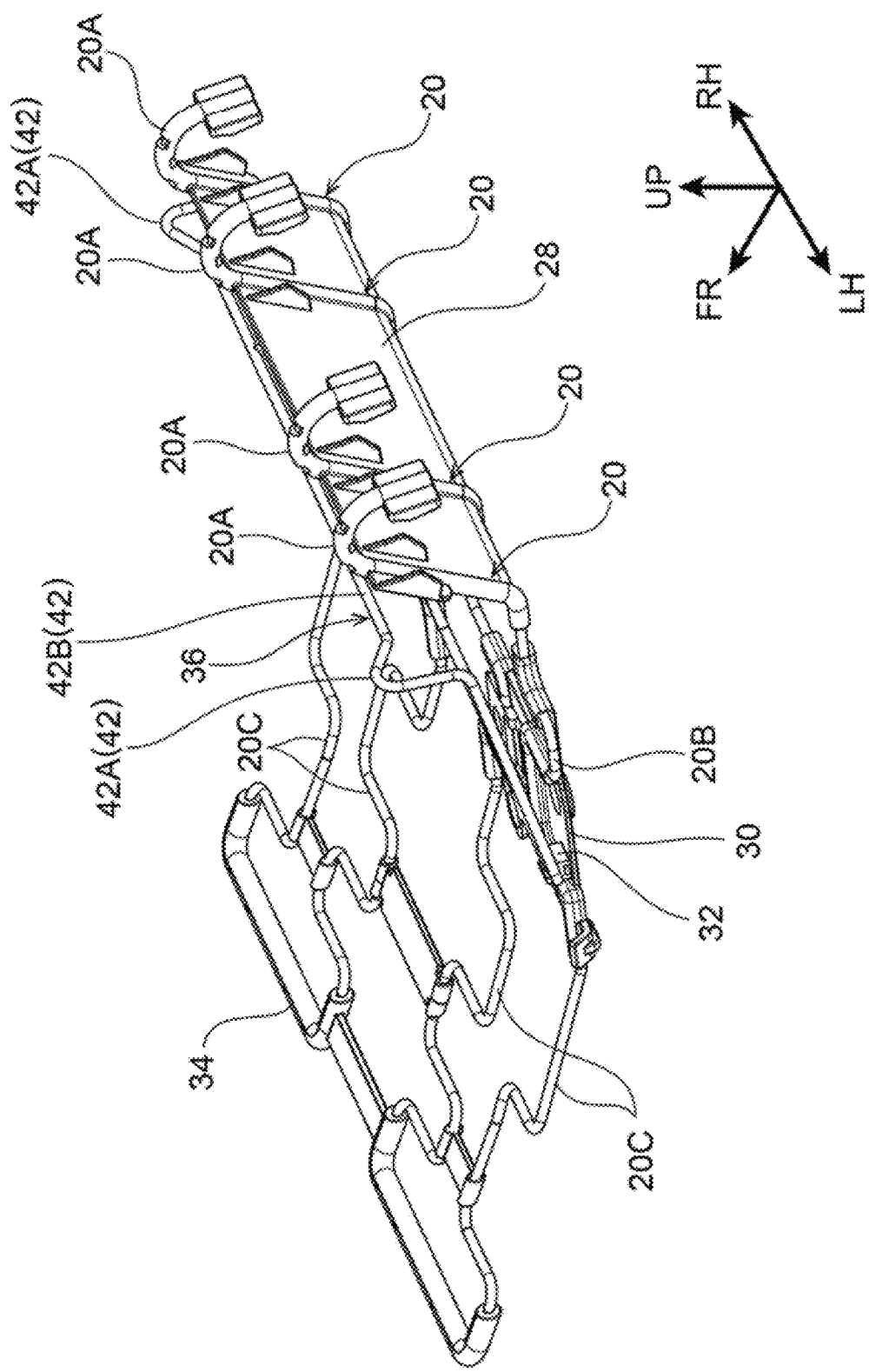
FIG. 3 is a perspective view in which the flap wire, which is supported by the plural S springs, is seen from an obliquely rear side of the seat.
Figure 4:
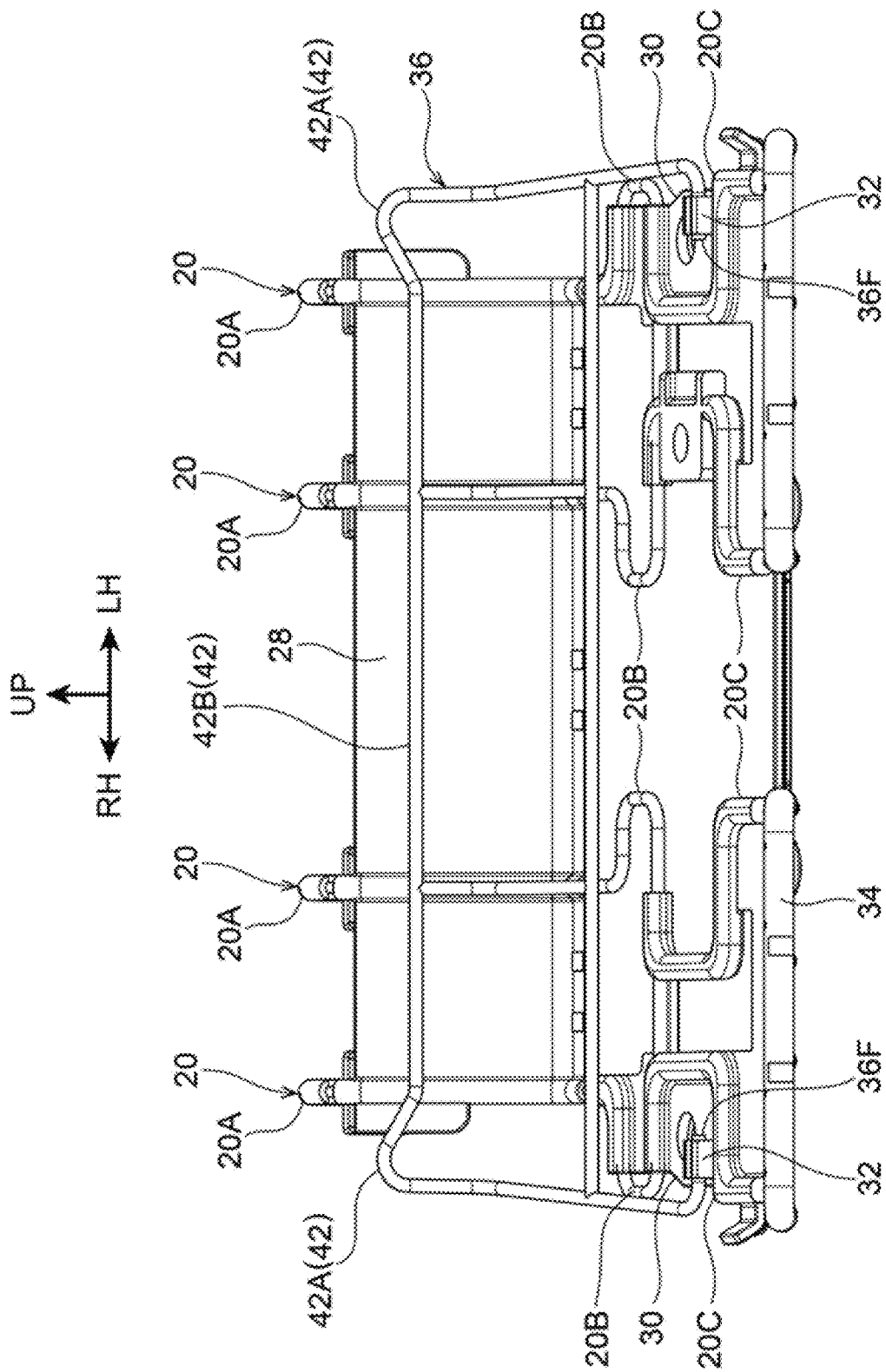
FIG. 4 is a front view in which the flap wire, which is supported by the plural S springs, is seen from the front side of the seat.

As shown in FIG. 2 through FIG. 4, the S springs 20 that serve as spring portions are formed by rod-shaped steel members being bent or the like. Here, in the present embodiment, four of the S springs 20 are provided so as to be lined-up in the left-right direction. The end portions at the rear sides of the four S springs 20 are rear anchor portions 20A that are curved in U-shapes whose lower sides are open. These rear anchor portions 20A are anchored on the rear frame portion 26 (see FIG. 1) of the seat cushion frame 18. Further, the portions at the front sides of the rear anchor portions 20A of the four S springs 20 are connected in the left-right direction via a connecting plate 28 that is formed in the shape of a plate.

The four S springs 20 have inclined portions 20B that extend at inclines toward the lower side while heading toward the front side, from the lower ends of the front sides of the rear anchor portions 20A. The intermediate portions in the front-rear direction of these inclined portions 20B are bent in the left-right direction. The two inclined portions 20B at the left side are connected in the left-right direction via a supporting plate 30 that is formed in the shape of a plate. Further, the two inclined portions 20B at the right side are connected in the left-right direction via the supporting plate 30 that is formed in the shape of a plate. Supporting members 32, on which are anchored portions of a flap wire 36 that is described later, are fixed to the left side end portion of the left-side supporting plate 30 and to the right side end portion of the right-side supporting plate 30, respectively. These supporting members 32 project-out toward the upper side with respect to the supporting plates 30 and the inclined portions 20B.

The four S springs 20 have horizontal portions 20C that extend toward the front side from the front ends of the inclined portions 20B. The front-rear direction intermediate portions of the horizontal portions 20C are bent in the left-right direction. Moreover, the front end portions of the horizontal portions 20C of the four S springs 20 are connected in the left-right direction via a front anchor portion 34. This front anchor portion 34 is anchored on the front frame portion 24 (see FIG. 1) of the seat cushion frame 18.

As shown in FIG. 1 through FIG. 4, the four S springs 20 undergo flexural deformation when load toward the lower side is inputted thereto via the seat cushion pad 22 in the state in which the four S springs 20 span between the rear frame portion 26 and the front frame portion 24 of the seat cushion frame 18.

Figure 7:
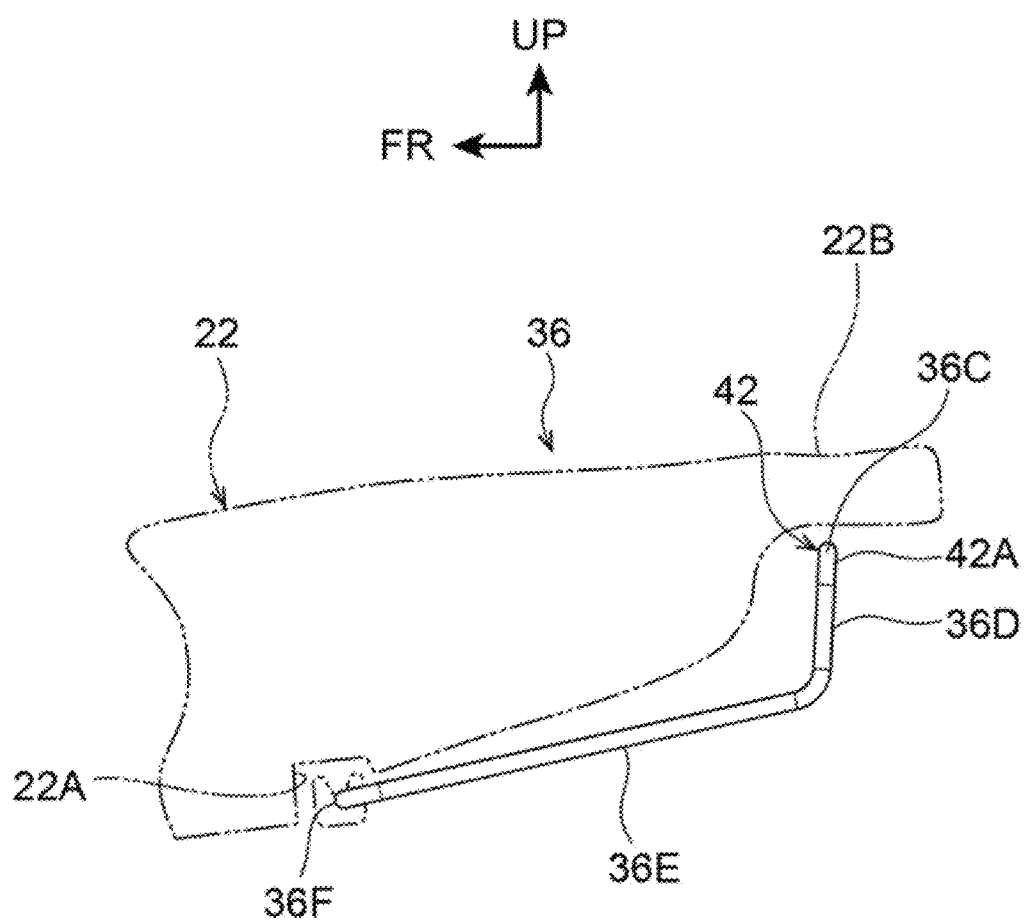
FIG. 7 is a left side view in which the flap wire is seen from the left side of the seat, and in which an anchor member and a seat cushion pad are illustrated by two-dot chain lines.

As shown in FIG. 1 and FIG. 7, the seat cushion pad 22 is formed by using urethane foam or the like. The seat cushion pad 22 is mounted to the seat cushion frame 18 in a state of being disposed along the four S springs 20 (see FIG. 2) and the flap wire 36 that is described later. Note that the surface that is at the seated vehicle occupant side of the seat cushion pad 22 is covered by an unillustrated surface material. Further, as shown in FIG. 7, a recess 22A, in whose interior the pair of left and right supporting members 32 that are described later are disposed, is formed in the lower portion of the seat cushion pad 22. The recess 22A is structured such that the lower side thereof is open.

As shown in FIG. 1 through FIG. 4, the pelvis supporting device 16 has the flap wire 36 that serves as a pelvis supporting portion, and is disposed at the upper side of the four S springs 20 and the lower side of the seat cushion pad 22, and is supported at the four S springs 20 via the pair of supporting plates 30 and the like. Further, the pelvis supporting device 16 has an actuator 38, and a cable 40 that connects the flap wire 36 and the actuator 38.

Figure 5:
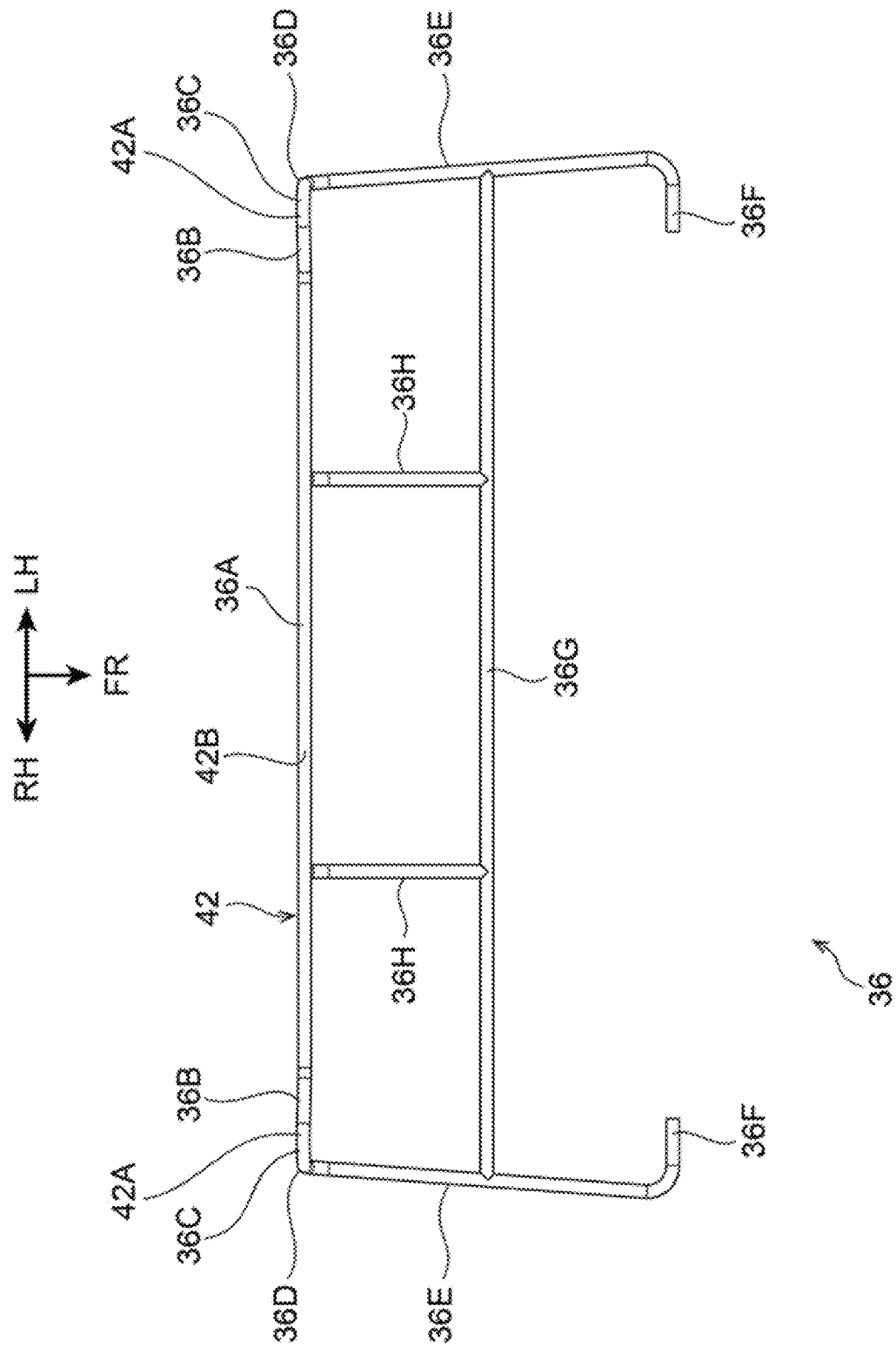
FIG. 5 is a plan view in which the flap wire is seen from the upper side of the seat.
Figure 6:
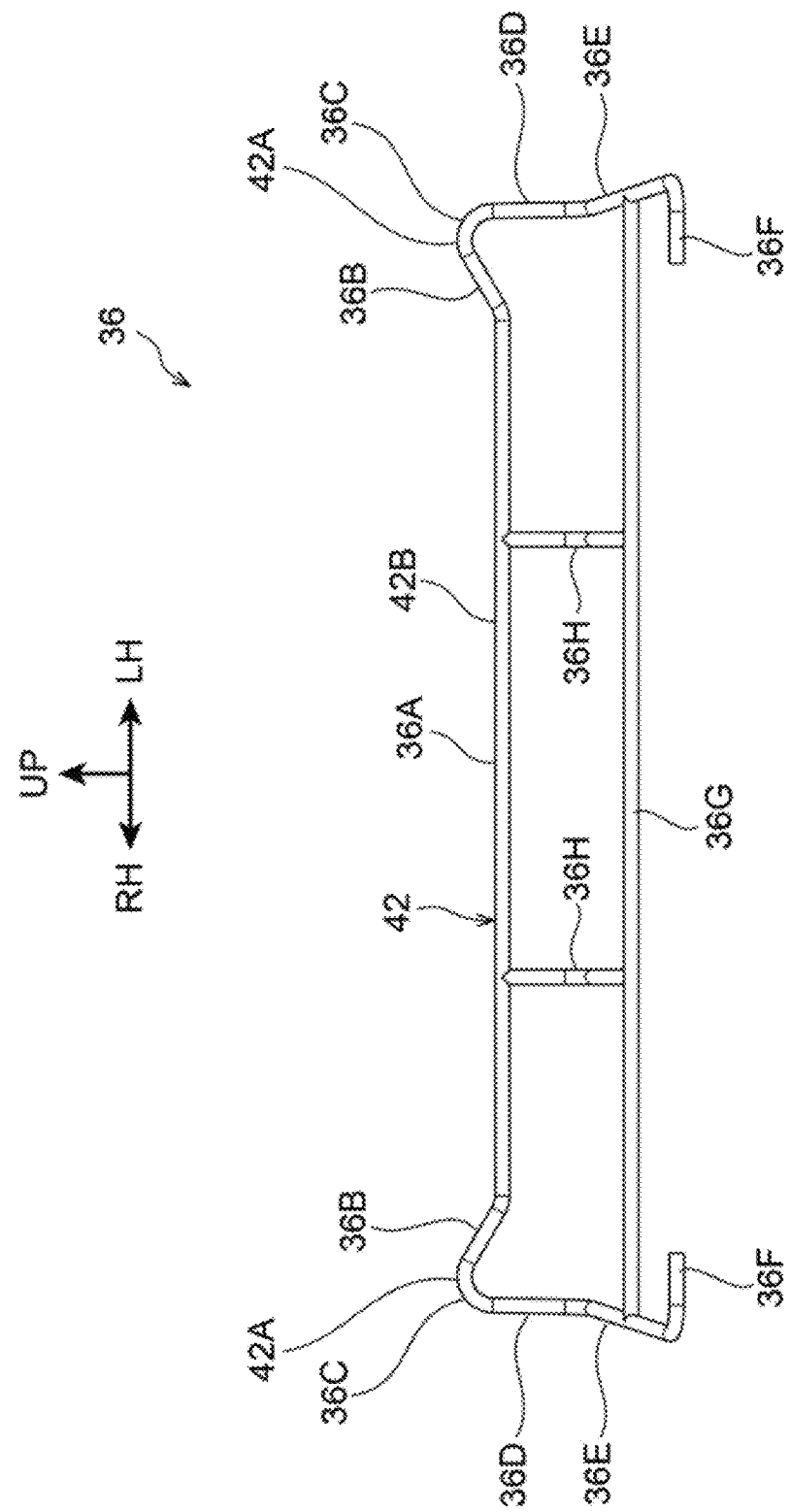
FIG. 6 is a front view in which the flap wire is seen from the front side of the seat.

As shown in FIG. 5 through FIG. 7, the flap wire 36 is formed by plural steel members that are formed in the shapes of rods being joined together by welding or the like. The flap wire 36 has a first extending portion 36A that extends in the left-right direction, and a pair of left and right second extending portions 36B that respectively extend at inclines toward the upper side from the left and right both ends of the first extending portion 36A. Further, the flap wire 36 has a pair of left and right curved portions 36C that are curved so as to be convex toward the upper side, at the sides of the pair of left and right second extending portions 36B which sides are opposite the first extending portion 36A, and a pair of left and right third extending portions 36D that respectively extend toward the lower side from the ends of the pair of left and right curved portions 36C which ends are at the sides opposite the second extending portions 36B. Moreover, the flap wire 36 has a pair of left and right fourth extending portions 36E that respectively extend toward the front side from the lower ends of the pair of left and right third extending portions 36D, and a pair of left and right supported portions 36F that respectively extend from the front ends of the pair of left and right fourth extending portions 36E toward the left-right direction central side of the seat cushion 12 (see FIG. 1).

Here, the pair of left and right second extending portions 36B and the pair of left and right curved portions 36C are a push-up portion 42 that pushes, toward the upper side, a rear side portion 22B (see FIG. 1) of the seat cushion pad 22. Both side portions 42A in the left-right direction of the push-up portion 42 are convex toward the seat upper side with respect to a central portion 42B in the seat left-right direction at the push-up portion 42. In other words, as shown in FIG. 8, the shape of the push-up portion 42 is a shape that corresponds to the shape of buttocks P1 of a seated vehicle occupant P. Note that the both side portions 42A in the left-right direction of the push-up portion 42 correspond to the pair of left and right second extending portions 36B and the pair of left and right curved portions 36C. Further, the central portion 42B in the seat left-right direction at the push-up portion 42 corresponds to the first extending portion 36A. Length dimension W of the central portion 42B in the seat left-right direction at the push-up portion 42, and height H, with respect to the central portion 42B, of the both side portions 42A in the left-right direction of the push-up portion 42 are set in consideration of an average physique of the seated vehicle occupant P.

The flap wire 36 has a connecting portion 36G that connects the front-rear direction intermediate portions of the pair of left and right fourth extending portions 36E in the left-right direction. Moreover, the flap wire 36 has a pair of left and right stiffening portions 36H that connect left-right direction intermediate portions of the first extending portion 36A and left-right direction intermediate portions of the connecting portion 36G. The pair of left and right stiffening portions 36H are bent in substantial L-shapes as seen from the seat right side surface, and are disposed with an interval therebetween in the left-right direction.

The above-described flap wire 36 is supported by the four S springs 20 due to the pair of left and right supported portions 36F of the flap wire 36 being anchored on the pair of left and right supporting members 32. Further, in the state in which the pair of left and right supported portions 36F of the flap wire 36 are anchored on the pair of left and right supporting members 32, the pair of left and right supported portions 36F can rotate with the left-right direction being the axial direction. Due thereto, the flap wire 36 is tilted in the seat vertical direction with the supporting portions 36F being the center of rotation.

As shown in FIG. 1, the actuator 38 is a motor actuator as an example. When the actuator 38 operates due to the vehicle occupant who is seated in the vehicle seat 10 operating a switch or the like, the cable 40 is pulled. Due thereto, the flap wire 36 is tilted, and the push-up portion 42 rises up.

Operation and Effects of Present Embodiment

Operation and effects of the present embodiment are described next.

As shown in FIG. 1, at the vehicle seat 10 of the present embodiment, when the actuator 38 operates due to a seated vehicle occupant operating a switch or the like, the flap wire 36 tilts, and the push-up portion 42 of the flap wire 36 rises. Due thereto, the rear side portion 22B of the seat cushion pad 22 is pushed toward the upper side by the push-up portion 42 of the flap wire 36. Due thereto, the pelvis of the vehicle occupant who is seated on the seat cushion 12 is supported. Note that, in FIG. 1, the state in which the rear side portion 22B of the seat cushion pad 22 is pushed toward the upper side by the push-up portion 42 of the flap wire 36 is shown by the two-dot chain line.

Here, as shown in FIG. 1 through FIG. 4, in the present embodiment, due to the push-up portion 42 of the flap wire 36 being provided continuously along the left-right direction at the lower side of the seat cushion pad 22, the body pressure of the buttocks of the seated vehicle occupant can be dispersed along the left-right direction.

Further, in the present embodiment, the both side portions 42A in the left-right direction of the push-up portion 42 of the flap wire 36 are formed in shapes that are convex toward the upper side, with respect to the central portion 42B. Due thereto, as shown in FIG. 1 and FIG. 8, at the time when the push-up portion 42 of the flap wire 36 rises-up, the rear side portion 22B of the seat cushion pad 22 can be pushed-up in a shape that runs along the buttocks P1 of the seated vehicle occupant P.

Moreover, in the present embodiment, the push-up portion 42 can be moved in the vertical direction by the simple structure of causing the flap wire 36 to tilt in the vertical direction with the supported portions 36F being the center of rotation.

Further, in the present embodiment, the push-up portion 42 of the flap wire 36 is disposed further toward the rear side than the supported portions 36F. Due thereto, needless pushing-up of the portion, which is further toward the front side than the portion that is pushed-up by the push-up portion 42, at the seat cushion pad 22 can be suppressed. Namely, it is possible to push-up only the portion, which is needed in order to support the pelvis of the seated vehicle occupant, of the seat cushion 12.

Moreover, in the present embodiment, the flap wire 36 is supported by the four S springs 20. Due thereto, even if the flap wire 36 is not provided with the function of a spring, a deterioration in the seating comfort due to the provision of the flap wire 36 can be suppressed.

In the present embodiment, as shown in FIG. 7, the recess 22A, in whose interior the pair of left and right supporting members 32 are disposed, is formed at the lower portion of the seat cushion pad 22. Due thereto, the body pressure of the buttocks of the seated vehicle occupant increasing at the portions corresponding to the supporting members 32 can be suppressed. Namely, the sensation of a foreign object at the time when the vehicle occupant is seated on the seat cushion 12 can be suppressed.

Note that, although the present embodiment describes an example in which the recess 22A, in whose interior the pair of left and right supporting members 32 are disposed, is formed in the seat cushion pad 22, the present disclosure is not limited to this. For example, depending on the placement and the structure of the supporting members 32, there may be a structure in which this recess 22A is not formed.

The present embodiment describes a structure in which the flap wire 36 is supported by the four S springs 20, but the present disclosure is not limited to this. For example, there may be a structure in which the flap wire 36 is provided with a spring property, and the seat cushion frame 18 is made to support the flap wire 36.

Moreover, the present embodiment describes an example in which the push-up portion 42 is moved in the vertical direction due to the flap wire 36 being tilted in the vertical direction with the supported portions 36F being the center of rotation. However, the present disclosure is not limited to this. For example, there may be a structure in which, due to an entire member that corresponds to the flap wire 36 moving in the vertical direction, a portion that corresponds to the push-up portion 42 moves in the vertical direction at this member.

Although the present embodiment describes an example in which the both side portions 42A in the left-right direction of the push-up portion 42 of the flap wire 36 are formed in shapes that are convex toward the upper side with respect to the central portion 42B, the present disclosure is not limited to this. The shape of the push-up portion 42 of the flap wire 36 may be set appropriately in consideration of the structure of the seat cushion pad 22 and the like.

Moreover, the present embodiment describes an example in which the flap wire 36 is structured by using rod-shaped steel members, but the present disclosure is not limited to this. For example, there may be a structure in which plate-shaped members are used at portions of a member that corresponds to the flap wire 36.

Although the present embodiment describes an example in which the flap wire 36 is tilted by using the actuator 38, the present disclosure is not limited to this. For example, there may be a structure in which the flap wire 36 is tilted due to the seated vehicle occupant operating a lever, and the operational force of this lever being transmitted to the flap wire 36.

Although an embodiment of the present disclosure has been described above, the present disclosure is not limited to the above and can, of course, be implemented by being modified in various ways other than the above within a scope that does not depart from the gist thereof.

What is claimed is:

1. A vehicle seat comprising:
    a seat cushion frame that structures a frame of a seat cushion and that is configured to support buttocks of a seated vehicle occupant;
    a seat cushion pad mounted to the seat cushion frame; and
    a pelvis supporting portion having a push-up portion that is provided at a seat lower side of the seat cushion pad along a seat left-right direction and that, by being displaced toward a seat upper side, pushes a seat rear side portion of the seat cushion pad toward the seat upper side,
    wherein both side portions in the seat left-right direction of the push-up portion are formed in shapes that are convex toward the seat upper side, with respect to a central portion in the seat left-right direction of the push-up portion.

2. The vehicle seat of claim 1, wherein:
    the pelvis supporting portion has supported portions that are supported so as to be able to rotate with the seat left-right direction being an axial direction, and
    the push-up portion moves in a seat vertical direction due to the pelvis supporting portion being tilted in the seat vertical direction with the supported portions being a center of rotation.

3. The vehicle seat of claim 2, wherein the push-up portion is disposed further toward a seat rear side than the supported portions.

4. The vehicle seat of claim 1, wherein:
    spring portions, which span across the seat cushion frame and which undergo flexural deformation at a time when a load toward the seat lower side is inputted thereto from the seat cushion pad, are provided at the seat lower side of the seat cushion pad, and
    the pelvis supporting portion is supported by the spring portions.

5. The vehicle seat of claim 4, wherein:
    the pelvis supporting portion has supported portions that are supported so as to be able to rotate with the seat left-right direction being an axial direction,
    the push-up portion moves in a seat vertical direction due to the pelvis supporting portion being tilted in the seat vertical direction with the supported portions being a center of rotation,
    supporting members at which the supported portions are supported are fixed to the spring portions, and
    a recess, in whose interior the supporting members are disposed, is formed in the seat cushion pad.

6. A vehicle seat comprising:
    a seat cushion frame that structures a frame of a seat cushion and that is configured to support buttocks of a seated vehicle occupant;
    a seat cushion pad mounted to the seat cushion frame; and
    a pelvis supporting portion having a push-up portion that is provided at a seat lower side of the seat cushion pad along a seat left-right direction and that, by being displaced toward a seat upper side, pushes a seat rear side portion of the seat cushion pad toward the seat upper side,
    wherein:
    spring portions, which span across the seat cushion frame and which undergo flexural deformation at a time when a load toward the seat lower side is inputted thereto from the seat cushion pad, are provided at the seat lower side of the seat cushion pad,
    pelvis supporting portion is supported by the spring portions,
    the pelvis supporting portion has supported portions that are supported so as to be able to rotate with the seat left-right direction being an axial direction,
    the push-up portion moves in a seat vertical direction due to the pelvis supporting portion being tilted in the seat vertical direction with the supported portions being a center of rotation,
    supporting members at which the supported portions are supported are fixed to the spring portions, and
    a recess, in whose interior the supporting members are disposed, is formed in the seat cushion pad.

* * * * *